United States Patent [19]

Stein

[11] Patent Number: 4,611,930

[45] Date of Patent: Sep. 16, 1986

[54] PYROMETER MEASUREMENTS IN THE PRESENCE OF INTENSE AMBIENT RADIATION

[75] Inventor: Alexander Stein, Secaucus, N.J.

[73] Assignee: Exxon Research and Engineering Co., Florham Park, N.J.

[21] Appl. No.: 750,160

[22] Filed: Jul. 1, 1985

Related U.S. Application Data

[63] Continuation of Ser. No. 562,164, Dec. 16, 1983, abandoned.

[51] Int. Cl.[4] ............................................. G01J 5/06
[52] U.S. Cl. .................................. 374/126; 374/121; 374/129
[58] Field of Search ............... 374/129, 133, 121, 126, 374/2, 9, 128, 132; 356/43, 45

[56] References Cited

U.S. PATENT DOCUMENTS 3,986,384 10/1976 Giorgi ................................. 374/126
4,144,758 3/1979 Roney ................................ 374/126

Primary Examiner—Charles Frankfort
Assistant Examiner—Thomas B. Will
Attorney, Agent, or Firm—Ronald D. Hantman

[57] ABSTRACT

The invention teaches a method for measuring the temperature of remote hot samples in the presence of ambient radiation. A portion of the surface of the sample is treated to obtain a spectral emissivity different from the untreated surface. The spectral radiances of the treated and untreated surface portions are measured and the temperature calculated from these values and the known emissivities.

5 Claims, 1 Drawing Figure

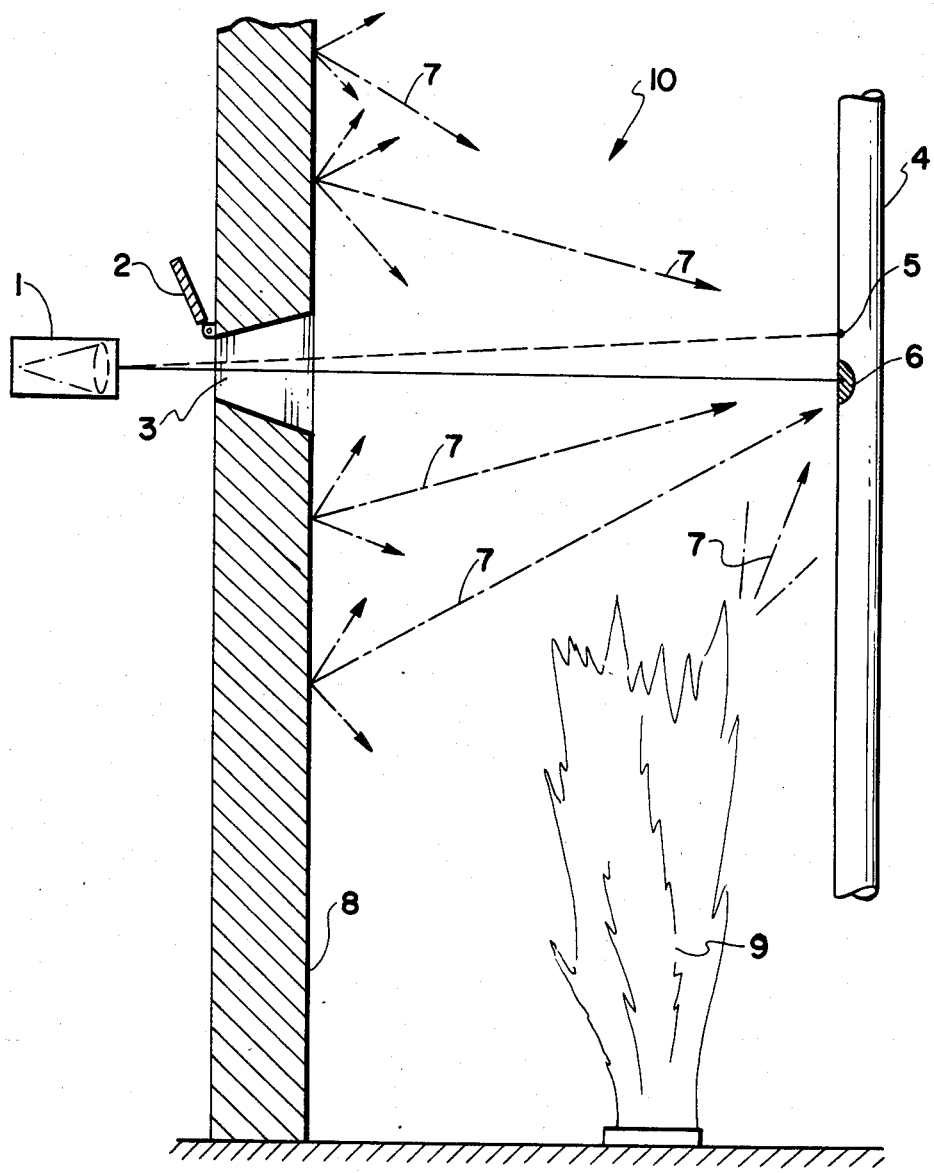

PYROMETER MEASUREMENTS IN THE PRESENCE OF INTENSE AMBIENT RADIATION

This is continuation of application Ser. No. 562,164, filed 12/16/83 now abandoned.

BACKGROUND OF THE INVENTION

The present invention relates to temperature measurements of remote hot samples.

The temperature of hot samples can be inferred from its spectral radiance at one particular wavelength if the spectral emissivity is known or from a value of spectrally integrated radiance if a spectrally averaged effective emissivity is known. However, if the sample is exposed to intense ambient radiation the thermal radiance will be partially obscured by a portion of the ambient radiation reflected off the sample.

Such a situation is encountered in the radiation section of fired furnaces. The present invention is a method for separating the ambient radiation reflected off the sample from the thermal radiation emitted by the sample. It is then possible to obtain a true physical temperature of the sample.

SUMMARY OF THE INVENTION

The present invention is a method for measuring the temperature of a remote sample in the presence of ambient radiation by observing its radiant emittance at about a given wavelength. This is achieved by treating a portion of the surface of the sample to obtain a spectral emissivity different from the untreated sample at about the given wavelength. The spectral radiance from the treated surface portion and the untreated surface portion of said sample is measured with a radiometer at about the given wavelength. In addition, the spectral emissivities of both portions of the surface of the sample are obtained. The temperature of the sample is determined from the measured spectral radiances and the known spectral emissivities of the treated and untreated surface areas.

BRIEF DESCRIPTION OF THE DRAWING

The sole FIGURE shows a typical arrangement for practicing the invention.

DESCRIPTION OF PREFERRED EMBODIMENT

The present invention is a method for measuring the temperature of a remote hot sample in the presence of intense ambient radiation. For this purpose a portion of the sample surface is treated to change its emissivity for a selected wavelength or wavelength range. By a measurement of the spectral radiances from the treated and untreated (hot) surface areas one can determine the equivalent blackbody radiance for the sample temperature (and thus the temperature) provided that the spectral emissivities for the treated and untreated surface areas are known.

A general requirement of this technique is that the surface temperature of the treated and untreated areas are at least approximately equal. Thermal conduction and convection tend to equalize the temperature over the surface, but a certain temperature gradient remains due to an emissivity-dependent difference in the radiative heating rate. In order to minimize the temperature gradient it is preferable to select a surface treatment that renders the treated area about equal in total emissivity to that of the untreated surface, but different in spectral emissivity at about a selected wavelength.

The surface treatment can be done by painting or coating with refractory materials, etching, sandblasting or any other treatment to modify the spectral emissivity. Alternatively, one could attach a separate body of different emissivity in close thermal contact with the sample.

A small spot on the surface of the sample is painted with a refractory material that has a different spectral emissivity at a particular wavelength or wavelength range than the unpainted surface of the sample. As discussed above, one selects the paint such that its total emissivity is approximately equal to that of the unpainted surface, but different at the particular wavelength, to provide for equal radiative heating at the painted and unpainted portions of the sample. Such paints include mixtures of TaC or NbB powder with $A_2O_3$ or $SiO_2$ powder. A paint formulated in this fashion exhibits a relatively low emissivity in the wavelength range of 1–3 $\mu$m. Above and below this range the emissivity increases towards unity. According to our invention then, the pyrometer measurement would be made in the 1 to 3 $\mu$m range. The effective total emissivity can be adjusted by varying the mixture and the thickness of the painted layer.

Using two relations:

$$R = \epsilon R_B(T) + (1-\epsilon)R_A$$

$$R' = \epsilon' R_B(T) + (1-\epsilon')R_A$$

where R and R′ are the apparent spectral radiances at about a selected wavelength for the unpainted and painted portions of the sample; $\epsilon$ and $\epsilon'$ are the respective emissivities at about the selected wavelength; $R_B(T)$ is the spectral radiance of a black body at the temperature T; and $R_A$ is the ambient spectral radiance to which the sample area of interest is exposed. By combining the above equations one gets for the blackbody radiance at temperature T:

$$R_B(T) = \frac{R(1-\epsilon') + R'(1-\epsilon)}{\epsilon - \epsilon'}$$

from which the temperature T is obtained via the Planck radiation formula.

The spectral emissivities of the treated and untreated portions of the surface of the sample must be known at particular wavelength or wavelength range. A standard technique for determining spectral emissivity involves heating of a representative sample to a precisely determined temperature and measurement of its spectral radiance. The ratio of that radiance to the blackbody spectral radiance at the above temperature is the spectral emissivity.

For purposes of description, the present invention shall be illustrated and described with respect to a fired refinery furnace. The FIGURE shows such a typical arrangement. To measure the temperature T of a metal tube 4 placed inside a fired furnace 10 where the tube 4 is exposed to ambient radiation 7 from the flames 9 and the furnace wall 8 one paints a small spot 6 on the tube 4 with a refractory material. The spectral emissivity $\epsilon'$, of the refractory paint is different from the spectral emissivity, $\epsilon$, of the unpainted tube at about the wavelength of observation. To distinguish between the thermal emission from the tube and the ambient radiation reflected off the tube one aims a radiometer (pyrometer), 1 alternatingly at the painted spot 6 and an adjacent point 5 on the unpainted surface measuring the respective spectral radiances R' and R at about a selected wavelength. Knowing the values $\epsilon$, $\epsilon'$, R, and R' one can calculate the blackbody radiance $R_B(T)$ for the sample temperature T from the above equation; and the temperature itself then from $R_B(T)$ using Planck's well known radiation formula.

What is claimed is:

1. A method for measuring the temperature of a remote sample in the presence of ambient radiation by observing its radiant emittance at about a given wavelength comprising:
   (a) treating a portion of a surface of said sample with a refractory material selected to have a total emissivity about equal to that of an untreated surface of said sample while exhibiting a different spectral emissivity than said untreated surface at said wavelength, said wavelength being within the range of 1 $\mu$m to 3 $\mu$m;
   (b) measuring the spectral radiance from said treated surface portion of said sample with a radiometer at about said given wavelength within the range 1 $\mu$m to 3 $\mu$m;
   (c) measuring the spectral radiance from an untreated surface portion of said sample adjacent to said treated surface portion with a radiometer at about said given wavelength within the range 1 $\mu$m to 3 $\mu$m such that the surface temperature of said treated portion is about equal to said surface temperature of said adjacent untreated portion of said sample;
   (d) obtaining the spectral emissivities of said untreated and said treated portions of said sample; and
   (e) computing said temperature of said sample from the said radiances and emissivities of said treated and untreated surface portions using the Planck radiation formula.

2. The method of claim 1 wherein said refractory material consists of a mixture of TaC and $Al_2O_3$.

3. The method of claim 1 wherein said refractory material consists of a mixture of TaC and $SiO_2$.

4. The method of claim 1 wherein said refractory material consists of a mixture of NbB and $Al_2O_3$.

5. The method of claim 1 wherein said refractory material consists of a mixture of NbB and $SiO_2$.

* * * * *